(12) United States Patent
Pritz

(10) Patent No.: US 12,736,753 B2
(45) Date of Patent: Sep. 15, 2026

(54) CIRCUIT BOARD HAVING AN OPTICAL FIBER

(71) Applicant: MD Elektronik GmbH, Waldkraiburg (DE)

(72) Inventor: Helmut Pritz, Ampfing (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 355 days.

(21) Appl. No.: 18/509,363

(22) Filed: Nov. 15, 2023

(65) Prior Publication Data

US 2024/0176076 A1 May 30, 2024

(30) Foreign Application Priority Data

Nov. 30, 2022 (DE) .................... 10 2022 131 715.3

(51) Int. Cl.
*G02B 6/32* (2006.01)

(52) U.S. Cl.
CPC .................................... *G02B 6/32* (2013.01)

(58) Field of Classification Search
CPC ....................................................... G02B 6/32
USPC ........................................................ 385/33
See application file for complete search history.

(56) References Cited

U.S. PATENT DOCUMENTS 4,995,695 A * 2/1991 Pimpinella ............ G02B 6/421 385/92
6,370,292 B1 4/2002 Strake
6,751,369 B1 * 6/2004 Lewis ................. G02B 6/3582 385/33
6,950,570 B1 * 9/2005 Novotny ............. G02B 6/3588 385/16
7,110,630 B2 * 9/2006 Suzuki ................ G02B 6/1225 385/52
7,440,646 B2 * 10/2008 Chen ................... G02B 6/4249 385/52
7,542,638 B2 * 6/2009 Blauvelt ............. G02B 6/2746 385/39
9,323,004 B2 * 4/2016 Taira ...................... G02B 6/124
9,529,155 B2 * 12/2016 Bhagavatula ........... G02B 6/32
(Continued)

FOREIGN PATENT DOCUMENTS

CN 1646960 A * 7/2005 ......... G02B 26/0875
DE 19838519 A1 3/2000
(Continued)

OTHER PUBLICATIONS

Gissibl et al., Two-Photon Direct Laser Writing of Ultracompact Multi-Lens Objectives, Nature Photonics, Jun. 2016, pp. 554-560, vol. 10, Macmillan Publishers Limited, London, United Kingdom.

*Primary Examiner* — Kaveh C Kianni
(74) *Attorney, Agent, or Firm* — LEYDIG, VOIT & MAYER, LTD.

(57) ABSTRACT

A circuit board includes a first side and an opposite second side, and at least one optical fiber for transmitting an optical signal, the at least one optical fiber extending in the circuit board between the first and second sides. A recess in the circuit board extends from the first side toward the second side at least to the at least one optical fiber. A lens system is disposed in the recess such that the optical signal is transmittable between the at least one optical fiber and a beam path parallel to the first side outside of the circuit board. The lens system includes a double lens and is made in one piece from a plastic material.

9 Claims, 1 Drawing Sheet

(56) References Cited

U.S. PATENT DOCUMENTS

| | | | | |
|---|---|---|---|---|
| 9,739,962 | B2 * | 8/2017 | Brenner | G02B 6/4284 |
| 9,995,889 | B2 * | 6/2018 | Yoda | G02B 6/4221 |
| 10,481,336 | B2 * | 11/2019 | Menard | G02B 6/3518 |
| 11,169,446 | B2 * | 11/2021 | Dietrich | B29C 59/16 |
| 11,921,334 | B2 * | 3/2024 | Hu | G02B 6/4214 |
| 2003/0118294 | A1 * | 6/2003 | Korenaga | G02B 6/4246<br>385/52 |
| 2003/0206703 | A1 * | 11/2003 | Chiu | G02B 6/4208<br>385/92 |
| 2005/0069261 | A1 * | 3/2005 | Arayama | G02B 6/423<br>385/52 |
| 2006/0022289 | A1 * | 2/2006 | Badhei | G02B 6/4214<br>257/432 |
| 2007/0081770 | A1 * | 4/2007 | Fisher | G02B 6/4201<br>385/92 |
| 2008/0240659 | A1 * | 10/2008 | Kopp | G02B 6/34<br>385/88 |
| 2015/0117824 | A1 * | 4/2015 | Wang | G02B 6/43<br>385/93 |
| 2015/0253520 | A1 * | 9/2015 | Huang | G02B 6/4206<br>385/93 |

FOREIGN PATENT DOCUMENTS

| | | | |
|---|---|---|---|
| DE | 19931944 | B4 | 10/2005 |
| DE | 202015003640 | U1 | 6/2015 |

* cited by examiner

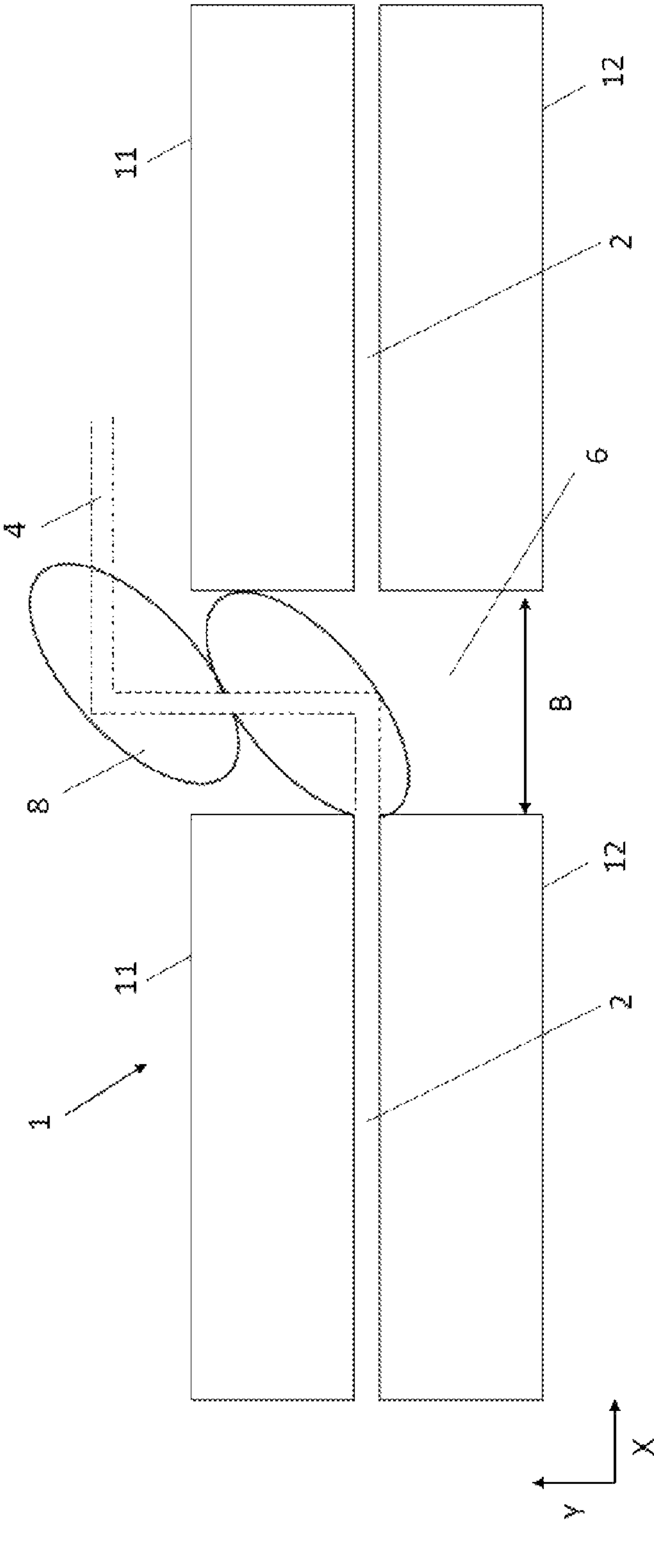
11
12
2
4
6
B
8
12
11
2
1
X
Y

CIRCUIT BOARD HAVING AN OPTICAL FIBER

CROSS REFERENCE TO RELATED APPLICATIONS

This application claims benefit to German Patent Application No. DE 10 2022 131 715.3, filed on Nov. 30, 2022, which is hereby incorporated by reference herein.

FIELD

The invention relates to a circuit board, also called printed circuit board or PCB, which has at least one optical fiber.

BACKGROUND

Circuit boards or printed circuit boards are used in the prior art in electric and electronic devices. Generally, printed circuit boards are composed of different layers containing electrical paths. Printed circuit boards having electrical paths have problems with electromagnetic influences from outside or emission to the outside as the frequency increases. This results in poor signal integrity and power dissipation.

One way to avoid these disadvantages is to use optical signals and to transmit them through optical fibers as conductive paths in the printed circuit board. This makes it possible to transmit the signals without disturbing influences and thus to maintain signal integrity.

In the prior art, special components are required for coupling into and out of the printed circuit board. Often, lens/mirror systems are used to couple signals into and out of the printed circuit board. These systems are difficult to integrate into a printed circuit board and occupy a lot of space.

SUMMARY

In an embodiment, the present invention provides a circuit board having a first side and an opposite second side, and at least one optical fiber for transmitting an optical signal, the at least one optical fiber extending in the circuit board between the first and second sides. A recess in the circuit board extends from the first side toward the second side at least to the at least one optical fiber. A lens system is disposed in the recess such that the optical signal is transmittable between the at least one optical fiber and a beam path parallel to the first side outside of the circuit board. The lens system includes a double lens and is made in one piece from a plastic material.

BRIEF DESCRIPTION OF THE DRAWINGS

Subject matter of the present disclosure will be described in even greater detail below based on the exemplary figure. All features described and/or illustrated herein can be used alone or combined in different combinations. The features and advantages of various embodiments will become apparent by reading the following detailed description with reference to the attached drawing, which illustrates the following:

FIG. 1 is a schematic cross-sectional view of an embodiment of a circuit board having an optical fiber.

DETAILED DESCRIPTION

In an embodiment, the present invention provides a simple and space-saving way of coupling optical signals into and out of a circuit board having an optical fiber.

In particular, a simple and space-saving way of coupling optical signals into and out of a circuit board having an optical fiber is achieved according to an embodiment of the present invention by a circuit board having a first side and an opposite second side, at least one optical fiber for transmitting an optical signal, the at least one optical fiber extending in the circuit board between the first and second sides, a recess in the circuit board, the recess extending from the first side toward the second side at least to the at least one optical fiber, and a lens system disposed in the recess so that the optical signal can be transmitted between the at least one optical fiber and a beam path parallel to the first side outside of the circuit board.

In principle, the recess can be flexibly disposed anywhere on the circuit board. This allows the present circuit board to be configured individually. Also, the recess can be formed into the circuit board at different points in time, so that the present circuit board can also be adapted later to requirements of the application. The lens system can also be flexibly designed or modified. Thus, the present circuit board is easy to manufacture and retrofit. The in-coupling and/or out-coupling of the optical signal parallel to the surface of the circuit board is very space-saving. For example, an optoelectric signal converter can be flexibly disposed at the edge of the present circuit board, while the lens system is located somewhere on the circuit board.

The lens system includes a double lens. The double lens is simple in construction and can be easily disposed in the recess. There will be no misalignment or contamination in the signal path of the lens system, such as occurs with mirrors in prior art.

The lens system is made in one piece from a plastic material. The one-piece or monolithic construction makes it easier for the lens system to be used or disposed in the recess. The production from plastic is easy and quick to implement. The properties, in particular the signal transmission properties, of the lens system can be optimally adapted to a specific lens system. This enables a high degree of flexibility for the present circuit board.

Preferably, the lens system does not use any mirrors or other optical components.

Preferably, the optical signal arriving from any direction parallel to the first side of the circuit board is collected by the lens system and transmitted to an optical fiber.

The recess preferably includes a bore. A bore is easy to make and can, in principle, be disposed anywhere on the circuit board, with access to the optical fiber. The bore may additionally include keying features in order for a matching lens system to be disposed with proper orientation in the recess.

Preferably, the lens system is form-fittingly disposed in the recess. The form-fitting arrangement prevents dirt and/or moisture from entering the recess. This makes it possible to ensure reliable signal transmission through the lens system.

Preferred embodiments will be described in detail below with reference to FIG. 1.

FIG. 1 shows an embodiment of a circuit board 1 having an optical fiber 2. The number of optical fibers may be greater in other embodiments. Optical fiber 2 preferably extends linearly within circuit board 1. In alternative embodiments, optical fiber 2 may also extend non-linearly, for example along a curved path. In alternative embodiments, circuit board 1 may include a plurality of layers containing optical fibers 2. The layers are preferably stacked one above another in a second direction Y. In the illustrated embodiment, circuit board 1 substantially extends at least in a first direction X. In other embodiments, optical fiber 2 may also extend in a third direction that extends into the plane of the paper or in a superposition of the first direction X and the third direction.

Optical fiber 2 is preferably composed of a plastic material and surrounded by a jacket. The refractive indices or optical properties of optical fiber 2 and of lens system 8 are matched to provide optimal signal transmission. In this context, "optimal" means without signal losses and/or unwanted reflections or scattering.

Lens system 8 does not use any mirrors or other optical components that could be contaminated and/or move out of position in the signal path. In a preferred embodiment, lens system 8 includes a double lens. The double lens is monolithic and conveys an optical signal 4 therewithin from the entry point to the exit point. The double lens can output the optical signal 4 at a parallel offset from the input, it being possible for the signal direction to be maintained or changed. "Changed" means, for example, that when optical signal 4 is conveyed out of circuit board 1 to the surface of circuit board 1, it may propagate in the opposite direction or an angularly offset direction parallel to the surface of circuit board 1. In the opposite direction, an optical signal arriving from any direction parallel to the surface of circuit board 1 (which, in FIG. 1, corresponds to first side 11), is collected by lens system 8 and transmitted to an optical fiber 2, the optical fiber 2 then having a certain direction within circuit board 1.

Recess 6 has a width B. Width B is matched to lens system 8. Width B can be different for different lens systems 8. If a recess 6 should no longer contain a lens system 8, a properly fitting piece can be inserted into recess 6 to transmit optical signal 4 along optical fiber 2. The fitting piece includes an optical fiber that can be directly coupled to or disposed at optical fiber 2 within circuit board 1. In FIG. 1, such a fitting piece would allow the optical signal 4 to be transmitted directly from one end to the other end of circuit board 1 along first direction X.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 circuit board
2 optical fiber
4 optical signal
6 recess
8 lens system
11 first side
12 second side
B width
X first direction
Y second direction

What is claimed is:

1. A circuit board, comprising:

a. a first side and an opposite second side;

b. at least one optical fiber for transmitting an optical signal, the at least one optical fiber extending in the circuit board between the first and second sides along a first direction;

c. a recess in the circuit board, the recess extending perpendicular to the first direction along a second direction from the first side toward the second side at least to the at least one optical fiber; and d. a lens system disposed in the recess such that the optical signal is transmittable between the at least one optical fiber and a beam path parallel to the first side outside of the circuit board, wherein e. the lens system includes a double lens and is made in one piece from a plastic material.

2. The circuit board according to claim 1, wherein the lens system does not use any mirrors.

3. The circuit board as recited in claim 1, wherein the optical signal is transmitted parallel to the first side of the circuit board, collected by the lens system, and then transmitted to the at least one optical fiber.

4. The circuit board as recited in claim 1, wherein the recess includes a bore.

5. The circuit board as recited in claim 1, wherein the lens system is form-fittingly disposed in the recess.

6. The circuit board as recited in claim 1, wherein the optical signal is transmitted from an optoelectric signal converter disposed at an edge of the circuit board, collected by the lens system, and then transmitted to the at least one optical fiber.

7. The circuit board as recited in claim 6, wherein the circuit board is configured such that the optoelectric signal converter can be arranged at any edge of the circuit board and the optical signal can thereby be transmitted via the lens system to the at least one optical fiber.

8. The circuit board according to claim 1, wherein the lens system does not use any mirrors nor any other optical components.

9. The circuit board according to claim 1, wherein the recess has sidewalls which extend perpendicular to the first direction.

* * * * *